United States Patent [19]

McClain et al.

[11] Patent Number: 4,789,775
[45] Date of Patent: Dec. 6, 1988

[54] OPTICAL SCANNER

[75] Inventors: Herbert D. McClain, Quaker; Ronald A. Ferrante, Senecaville, both of Ohio

[73] Assignee: NCR Corporation, Dayton, Ohio

[21] Appl. No.: 921,019

[22] Filed: Oct. 20, 1986

[51] Int. Cl.4 .............................................. G06K 7/10
[52] U.S. Cl. .................................. 235/470; 235/462; 250/222.1
[58] Field of Search ............... 235/436, 462, 458, 459, 235/461, 470, 455; 250/222.1

[56] References Cited

U.S. PATENT DOCUMENTS

| | | | |
|---|---|---|---|
| 2,971,096 | 2/1961 | Pratt | 250/217 |
| 2,975,335 | 3/1961 | Harris | 317/129 |
| 3,176,196 | 3/1965 | Dunigan | 317/125 |
| 3,227,929 | 1/1966 | McCreight | 317/129 |
| 3,293,415 | 12/1966 | Fiehl | 235/461 |
| 3,293,504 | 12/1966 | Percival | 317/124 |
| 3,783,273 | 1/1974 | Strohschneider | |
| 3,946,224 | 3/1976 | Allera et al. | 250/221 |
| 4,093,865 | 6/1978 | Nickl | 235/470 X |
| 4,125,767 | 11/1978 | Silver | 250/214 |
| 4,317,992 | 3/1982 | Stauffer | 250/221 |
| 4,329,581 | 5/1982 | Helfrich, Jr. et al. | 250/221 |
| 4,335,302 | 6/1982 | Robillard | 235/462 |
| 4,431,912 | 2/1984 | Dickson et al. | 235/455 X |

FOREIGN PATENT DOCUMENTS 0159608 10/1985 European Pat. Off. .
1219251 1/1971 United Kingdom .

OTHER PUBLICATIONS

M. Cappa; High Sensitivity, Wide Range Photo-Amplifier; IBM Tech. Discl. Bul., vol. 21, No. 8, Jan. 1979, pp. 3115-3116.

*Primary Examiner*—David L. Trafton
*Attorney, Agent, or Firm*—Wilbert Hawk, Jr.; Albert L. Sessler, Jr.; Richard W. Lavin

[57] ABSTRACT

An optical reader control system includes a source of radiant energy mounted above a checkout counter and detecting means mounted adjacent an aperture in the supporting surface of the counter receives the radiant energy to control the operation of the optical reader mounted within the counter for projecting scanning beams through the aperture. One embodiment of the detecting means includes a pair of photodetectors mounted in the supporting surface of the counter on both sides of the aperture for turning the optical reader on and off. A second embodiment includes a single photodetector mounted in the supporting surface upstream of the aperture for turning on the optical reader and a timer operable upon the positioning of a merchandise item over the photodetector for turning off the optical reader after the expiration of a predetermined time period.

1 Claim, 7 Drawing Sheets

OPTICAL SCANNER

BACKGROUND OF THE INVENTION

1. Field of the Invention

The present invention relates to checkout systems and more particularly to a checkout counter having sensing means for controlling the reading of coded labels attached to merchandise items during a checkout operation.

2. Description of the Prior Art

In order to increase the speed of the checkout operation, optical scanning devices have been incorporated into checkout counters for reading data encoded indicia on labels affixed to the purchased merchandise items. Movement of the merchandise items past the scanning device results in the scanning device reading the encoded indicia labels. To control the operation of the scanning device, detecting means have been positioned in the path of movement of the merchandise items to operate the scanning device in accordance with the position of the merchandise items with respect to the scanning device. Thus, a first or enter detector gate positioned upstream of the scanning device will turn on the scanning device for operation upon detecting the presence of a merchandise item upstream of the scanning device, while a second or exit detector gate located downstream of the scanning device will turn the scanning device off upon detecting the presence of the merchandise item downstream of the scanning device. Typically, the item gates are mounted in a structure located adjacent the scanning device and at a position above the level of the top surface of the checkout counter. Examples of this type of structure may be found in U.S. Pat. Nos. 4,086,476, issued to R. King, and 4,575,623, issued to V. Cononi, both of which are assigned to the assignee of the present invention. Where the installation requires that the checkout counter have a completely free top surface, the item gate structure disclosed in the above cited patents could not be used. Without the use of item gating, multiple read errors, as well as laser radiation overexposure, become problems.

The background art known to the applicants at the time of the filing of this application is as follows:

U.S. Pat. No. 3,946,224, Method And Device For Detecting The Passage Of Objects, by J. Allera et al.;

U.S. Pat. No. 4,317,992, Object Detecting Apparatus, by N. Stauffer; and

U.S. Pat. No. 4,329,581, Ambient Light Sensor Touch Switch System And Method, by R. C. Helfrich, Jr., et al.

SUMMARY OF THE INVENTION

A merchandise checkout counter includes a window portion located in the top surface of the counter through which scanning light beams are projected from a scanning mechanism mounted within the counter. The light beams scan a bar code label mounted on a merchandise item as the merchandise item moves past the window portion. Mounted adjacent the window portion in the top surface of the counter are a pair of photodiodes oriented in a vertical direction for receiving ambient light from a light source located above the checkout counter. Circuit means connected to each of the photodiodes generates signals representing the presence or absence of a merchandise item over the photodiodes to control the turning on and off of the scanning light beams. The upstream photodiode enables the scanning light beams to be projected through the window portion upon the movement of a merchandise item past the upstream photodiode while the downstream photodiode disables the projection of the light beam through the window as the merchandise item is positioned above the photodiode. A second embodiment includes only the upstream photodiode which controls a timer to generate a timeout period during which the scanning mechanism projects the light beam through the window portion in response to the positioning of a merchandise item over the photodiode.

It is therefore a principal object of this invention to provide an optical scanning system which may be incorporated in a checkout counter where the supporting surface is free from any upstanding structures.

It is another object of this invention to provide a low cost scanning system utilizing the ambient light from an overhead light source as part of the checkout operation.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Figure 1:
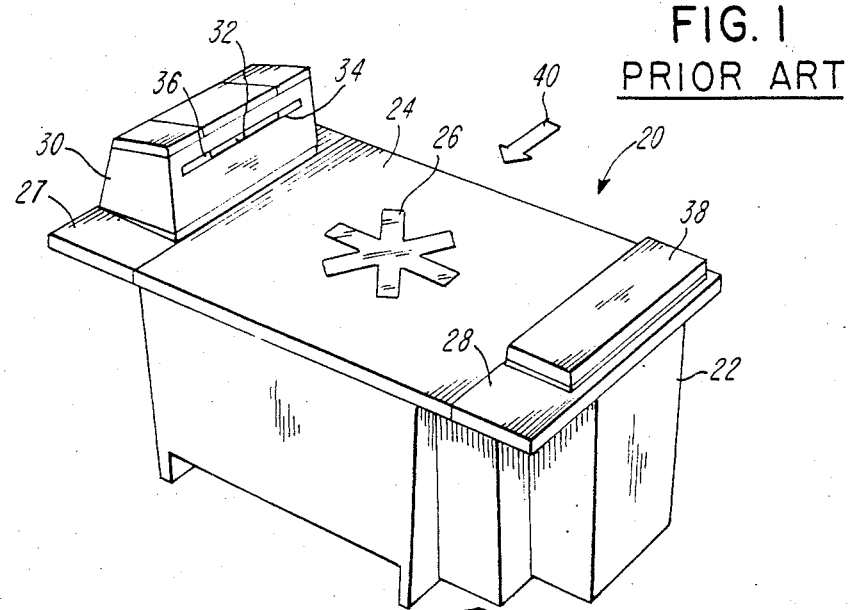
FIG. 1 is a perspective view of a prior art optical scanning device.

Referring now to FIG. 1, there is shown a perspective view of a typical prior art scanning device which is normally located in a checkout counter. The scanning device generally indicated by the numeral 20 includes a box-like structure 22 having a cover member 24 hinged at one end of the structure 22 by any conventional hinge members (not shown). The cover member 24 includes a plurality of glass covered apertures 26 arranged in the configuration shown in FIG. 1. Located within the structure 22 is an optical scanning mechanism (not shown) for generating and projecting scanning light beams through the apertures 26 in a manner that is well known in the art. Reference may be made to U.S. Pat. No. 4,093,865 for a complete description of the mounting of a typical bar code scanning device within an enclosed housing such as a checkout counter.

Located adjacent the cover member 24 are a pair of rail members 27 and 28. Mounted on the rail member 27 is a rail housing member 30 having a slotted portion 32 in which is mounted a pair of photodetectors such as photodiodes 34 and 36 comprising item gates. Mounted opposite on the rail member 28 is a housing member 38 in which is located a pair of light sources (not shown) mounted opposite said photodiodes 34 and 36, to project light beams at the photodiodes in a manner that is well known in the art. Movement of a merchandise item in the direction indicated by the arrow 40 will interrupt the transmission of the light beams projected at the photodiodes 34 and 36, resulting in the photodiodes outputting signals which control the operation of the scanning mechanism in a manner to be described more fully hereinafter.

Figure 2:
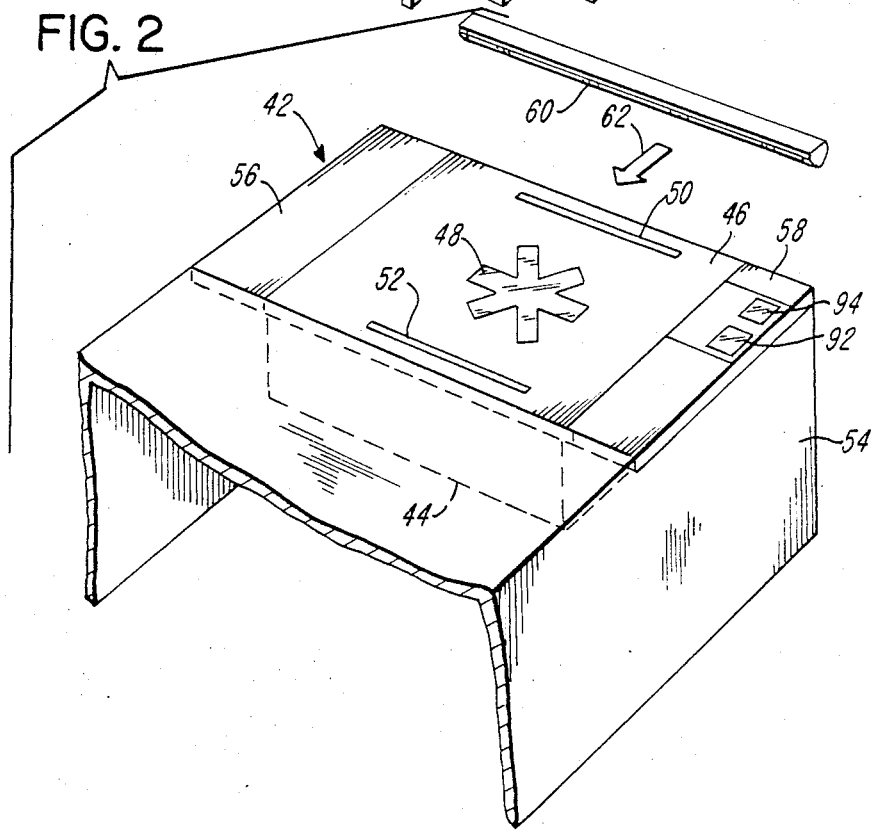
FIG. 2 is a perspective view of the optical scanning device of the present invention mounted within a checkout counter.
Figure 3:
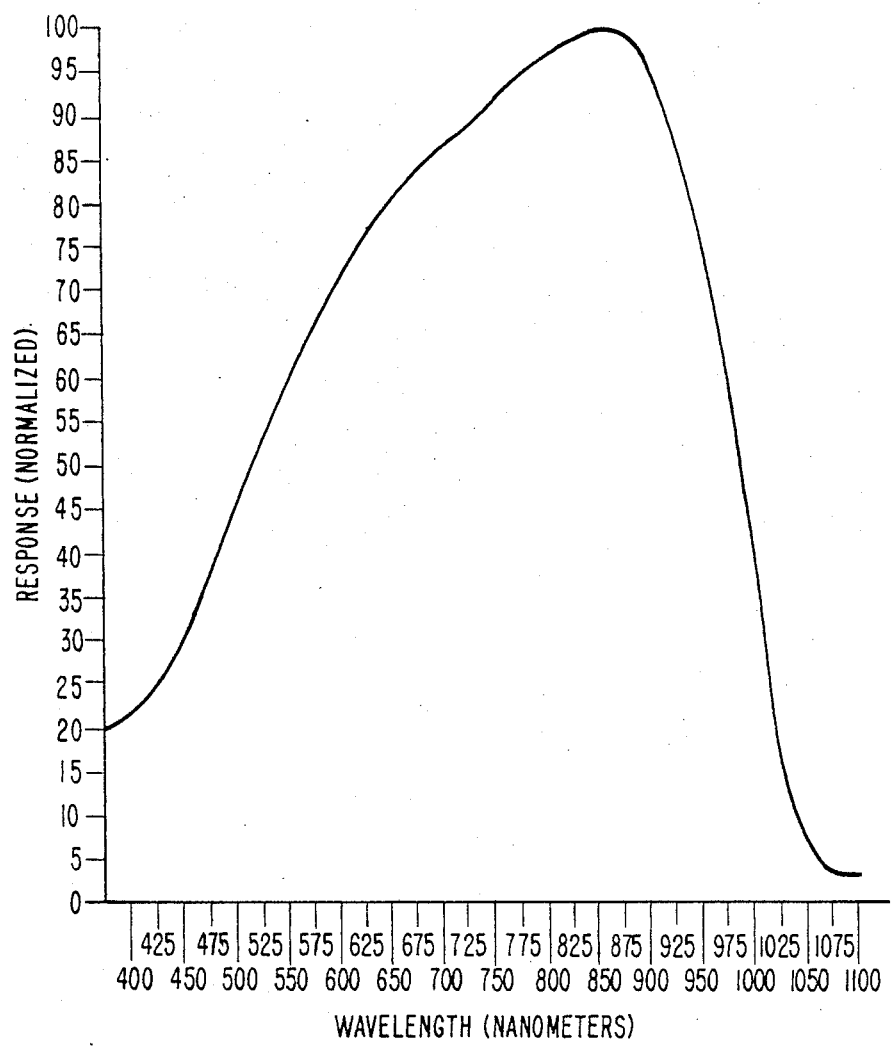
FIG. 3 is a graphical representation of the spectral response to various wavelengths of any light source of a silicon photodiode.
Figure 4:
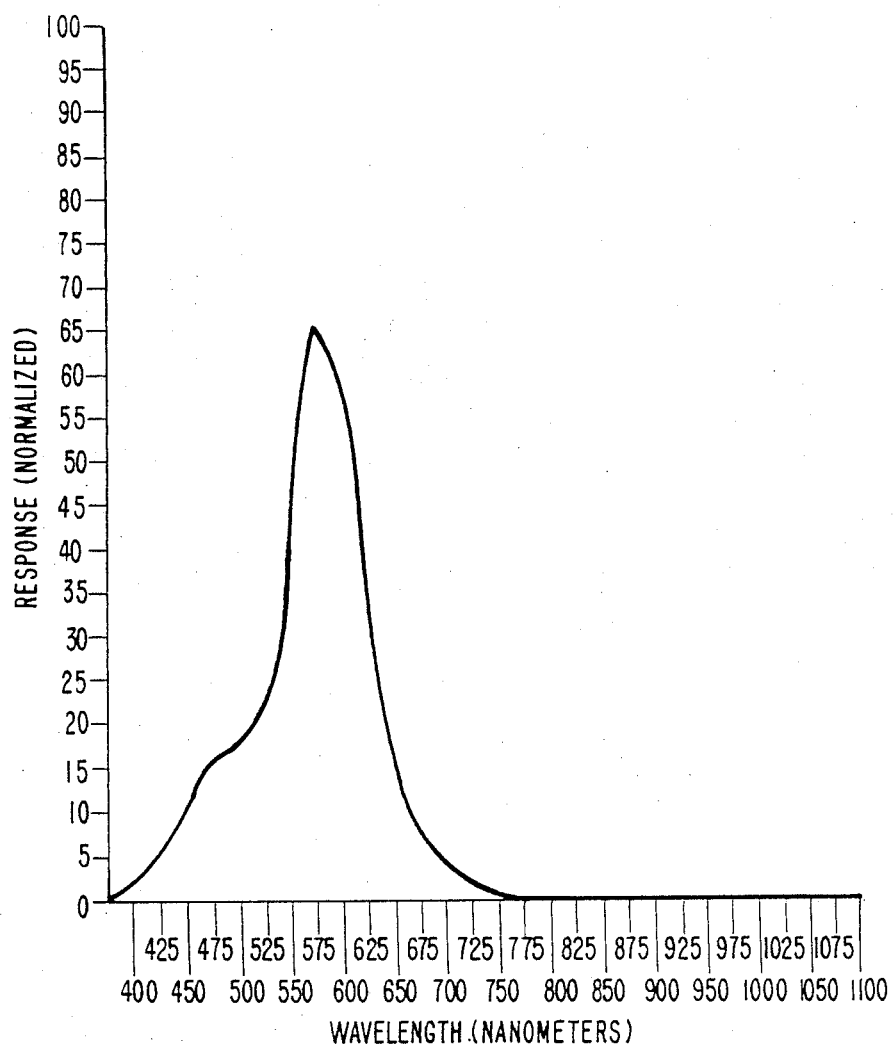
FIG. 4 is a graphical representation of the response of a silicon photodiode to a fluorescent light source.
Figure 5:
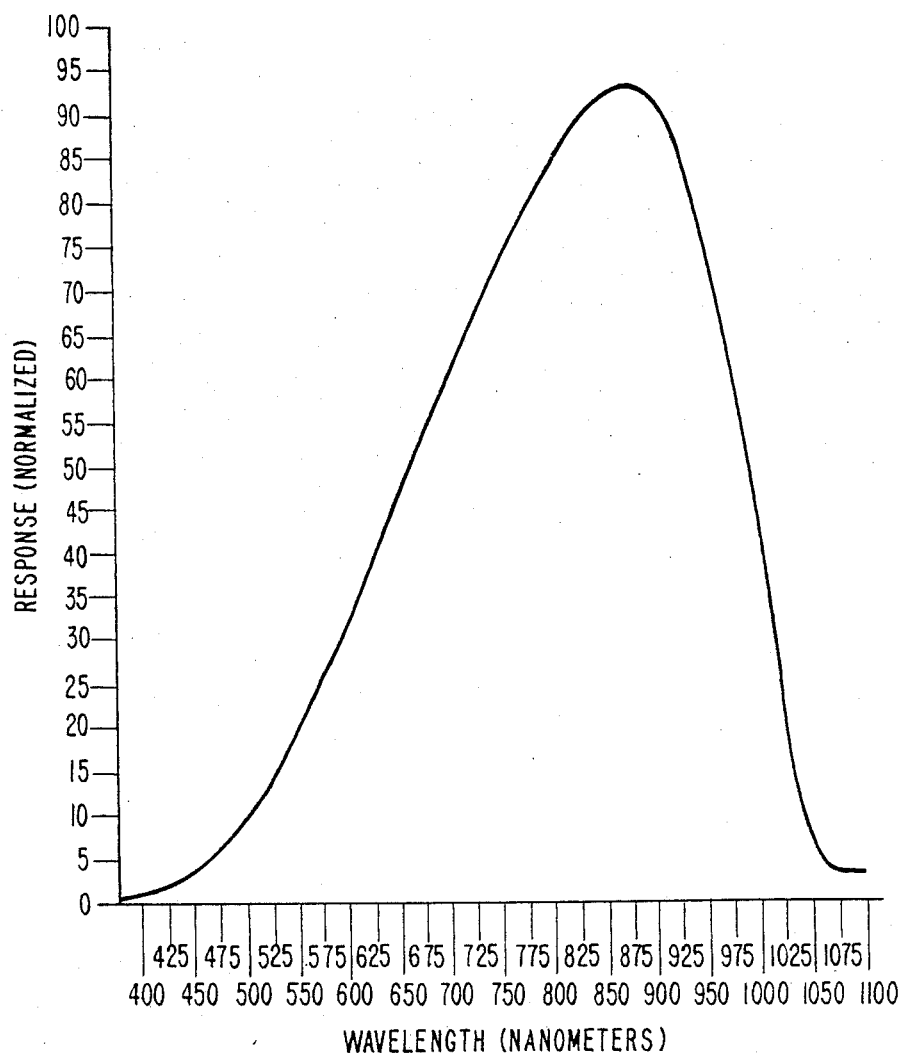
FIG. 5 is a graphical representation of the response of a silicon photodiode to a tungsten light source.

Referring now to FIG. 2, there is shown a perspective view of the optical scanning device of the present invention generally indicated by the numeral 42 which includes a box-like support structure 44 having a cover member 46 hinged at one end of the structure 44 by any conventional hinge members (not shown). The cover member 46 includes a plurality of apertures 48 formed in the configuration shown in FIG. 2 through which scanning light beams are projected by a scanning mechanism (not shown) mounted within the structure 44. Positioned on either side of the apertures 48 in the surface of the cover member 46 are a pair of glass covered slots 50 and 52 comprising item gates in which are mounted one or more silicon photodiodes. The scanning device 42 includes a pair of rail portions 56 and 58 and is shown mounted in the end portion of a checkout counter 54.

Located above the checkout counter 54 is an ambient overhead light source such as a fluorescent lamp 60. While a fluorescent lamp is disclosed, the invention may be utilized with any other type of light source such as a incandescent lamp or sun light. When a merchandise item is moved in the direction indicated by the arrow 62 over the flush mounted slots 50 and 52, the normal ambient light level is reduced. This reduction in the intensity level of the light striking the silicon photodiodes located in the slots 50 and 52 results in the generation of electrical signals used to control the operation of the optical scanning mechanism. The photodiode in the slot 50 will enable the scanning mechanism to project the scanning light beams through the apertures 48 while the photodiode in the slot 52 will turn off the projection of the light beams through the apertures.

Figure 6:
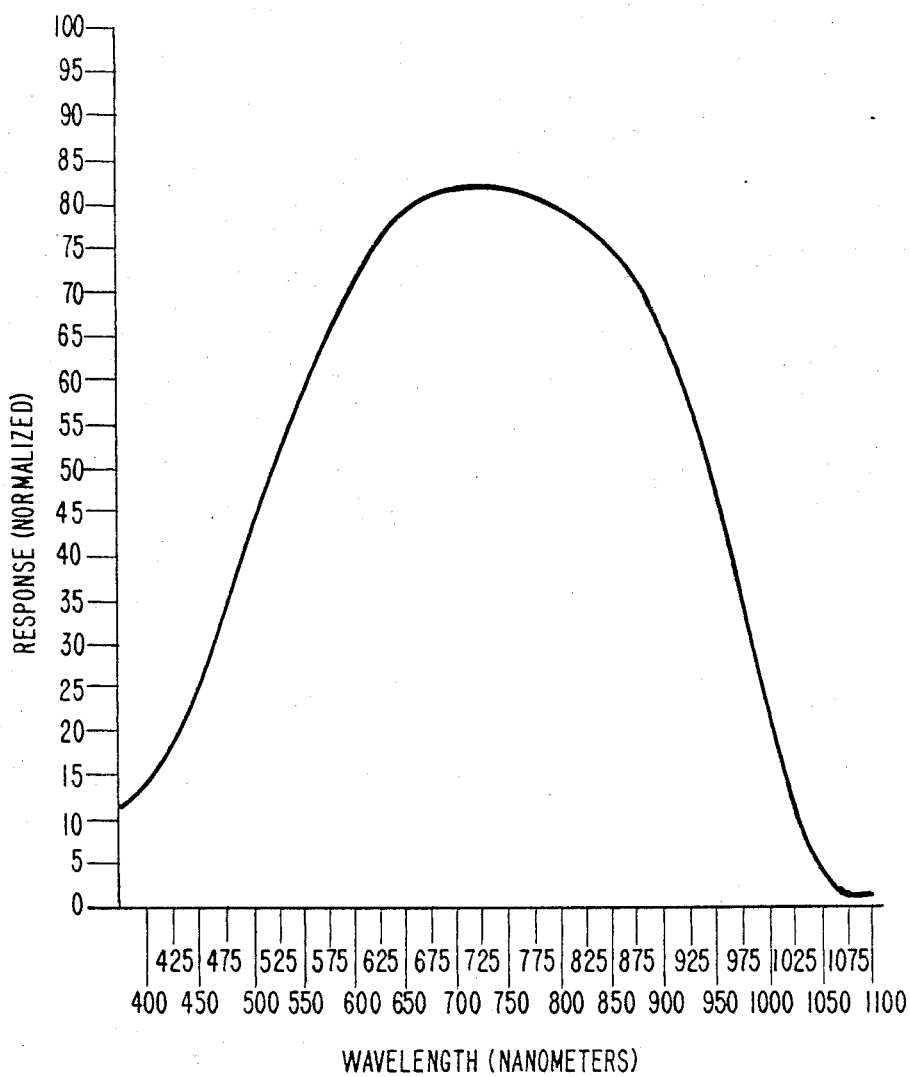
FIG. 6 is a graphical representation of the response of a silicon photodiode to a solar light source.

Referring now to FIGS. 3-6 inclusive, there is disclosed in graphical form the electrical response of a silicon photodiode with respect to various light sources. As shown in the figures, the use of a silicon photodiode has a sufficient normal spectral response to the wavelengths of any light source (FIG. 3) for use in this embodiment and also when the light source is a fluorescent lamp (FIG. 4), a incandescent lamp (FIG. 5) or sun light (FIG. 6).

Figure 7:
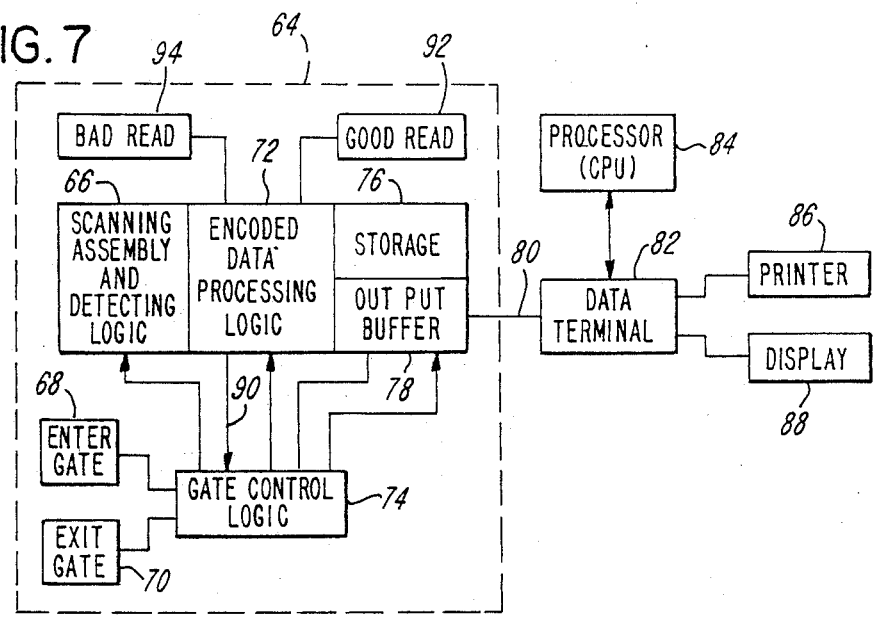
FIG. 7 is a simplified block diagram of the data processing system utilizing the optical scanning device of the present invention.

Referring now to FIG. 7, there is shown a simplified block diagram of the data processing system in which the scanning device of the present invention is incorporated. Included in the data processing system is a bar code scanning system 64 shown within the dotted line and which includes the scanning assembly and detecting logic unit 66 for processing signals generated by the scanning assembly, an item enter gate member 68 comprising one or more silicon photodiodes located in the slot 50 (FIG. 2) for receiving the light beams from the fluorescent lamp 60, an item exit gate member 70 comprising one or more silicon photodiodes located in the slot 52 (FIG. 2) also receiving light beams from the fluorescent lamp 60, an encoded data processing logic unit 72 for checking and decoding the encoded data read by the scanning assembly 64 and for generating a signal over line 90 to the gate control logic unit 74 to indicate the validity of the read operation; a conventional memory storage unit 76, an output buffer member 78 for transmitting the data read over line 80 to a data terminal device 82 and a central processing unit (C.P.U.) 84 connected to the data terminal device 82. The processing unit 84 processes the data read and generates data signals representing the price of the merchandise item. The price data signals are then transmitted back to the terminal device 82 which operates a printer 86 to print the price on a record member and operates a display 88 to display the price of the item to the customer in a manner that is well known in the art.

When the enter item gate 68 is enabled upon the positioning of a merchandise item over the slot 50 (FIG. 2), a signal is generated for enabling the scanning assembly 66 to scan the bar code label with light beams and transmit the data read to the processing logic unit 72. The processing logic unit will decode and check the data received to determine if the data is valid or not and then generate a control signal over line 90 to the gate control logic unit 74 indicating a good or bad read operation. If the scanning operation produces a good read, the logic unit 72 will operate a tone generator (not shown) that operates a good read indicator 92 (FIG. 7) located in the rail member 58 (FIG. 2) which, in the present embodiment is green. If the scanning operation produces a bad read, the logic unit 72 will operate a bad read indicator 94 located in the rail member 58 (FIG. 2) which, in the present embodiment, is red. This action will notify the operator to repeat the scanning movement of the merchandise item past the apertures 48.

Figure 8:
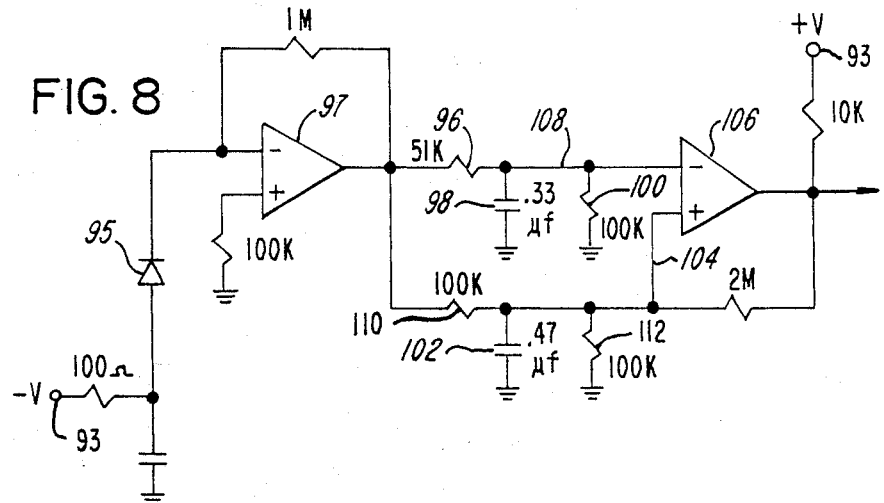
FIG. 8 is a schematic diagram of the gate control logic circuit for controlling the projection of the scanning light beams of the scanning device.

Referring now to FIG. 8, there is disclosed a schematic diagram of the control circuit located in the gate control logic unit 74 (FIG. 7) which will convert a change in the light level striking the silicon photodiode to an electrical signal which can be used to control various functions of the scanning apparatus such as turning on/off a laser beam (not shown) in the scanning device. The photodiode 95, which may be either of the photodiodes in the slots 50 and 52 (FIG. 2), produces an electrical current from a voltage source 93 in proportion to the amount of light striking its active element in a manner that is well known in the art. This current is converted by the amplifier 97 into a voltage signal which is applied across timing elements comprising resistors 96 and 110 and capacitors 98 and 102. The RC time constants are chosen so that the resistor 110 and capacitor 102 track long term changes in the order of ten seconds and apply said changes as a reference voltage level over line 104 to the positive input of the amplifier 106. Timing elements resistor 96 and capacitor 98 are chosen to respond to fast changes in the order of ten milliseconds and the corresponding voltage level is applied over line 108 to the negative input of the amplifier 106. The amplifier 106 is a voltage comparator that produces a low level output when the input voltage level on line 108 is positive with respect to the voltage level appearing on line 104 and produces a high level output when the voltage level appearing on line 108 is negative with respect to the voltage level appearing on line 104.

A voltage divider comprising resistors 96 and 100 will establish a quiescent level at the negative input of the voltage comparator 106 which will be more positive than the voltage level appearing on line 104 as determined by the voltage divider comprising the resistors 110 and 112. This condition will cause the output of the voltage comparator 106 to be normally at a low signal level which will be maintained for slowly varying light changes. When an object is moved over the photodiode 95, the light striking the diode is decreased and the resulting voltage level appearing at the negative input of the voltage comparator 106 will drop rapidly. This action will cause the voltage level appearing on line 108 to become more negative than the slowly changing voltage level appearing on line 104 which will cause the output of the voltage comparator 106 to switch to a high level. This high level output of the voltage comparator 106 can be used as a logic signal to represent the presence or absence of an item over the scanner. This type of circuit operates in a photoconduction mode and allows automatic correction for slow changes in ambient light levels.

Figure 9:
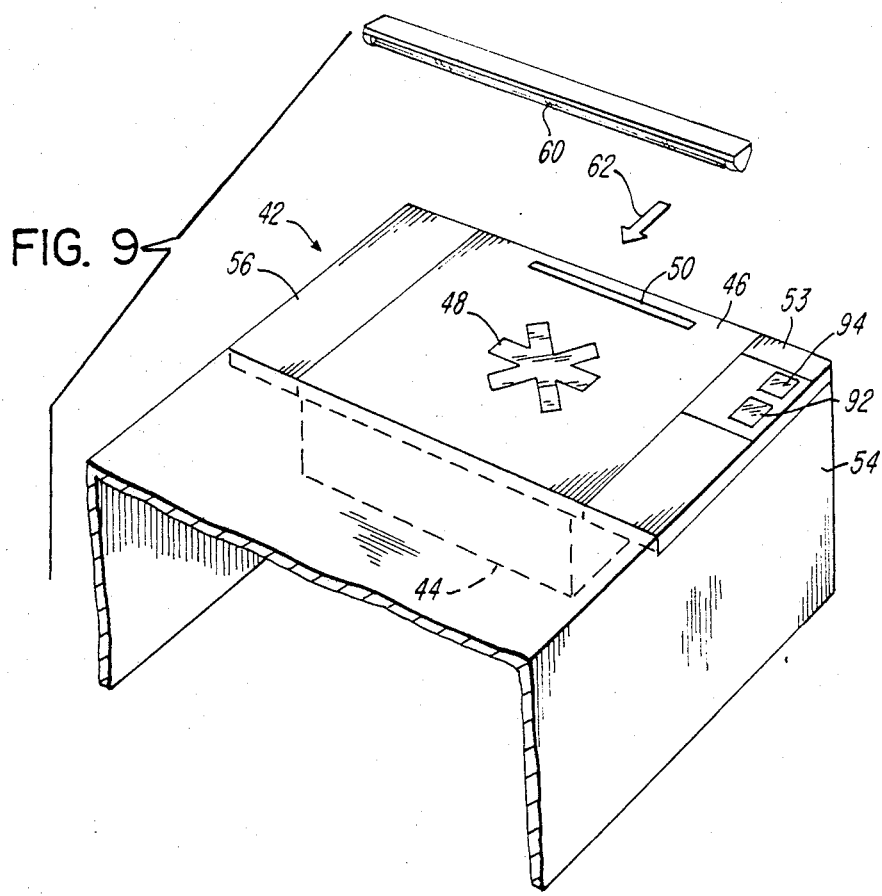
FIG. 9 is a view similar to FIG. 2 showing a second embodiment of the invention in which the scanning mechanism includes only the enter item gate.
Figure 10:
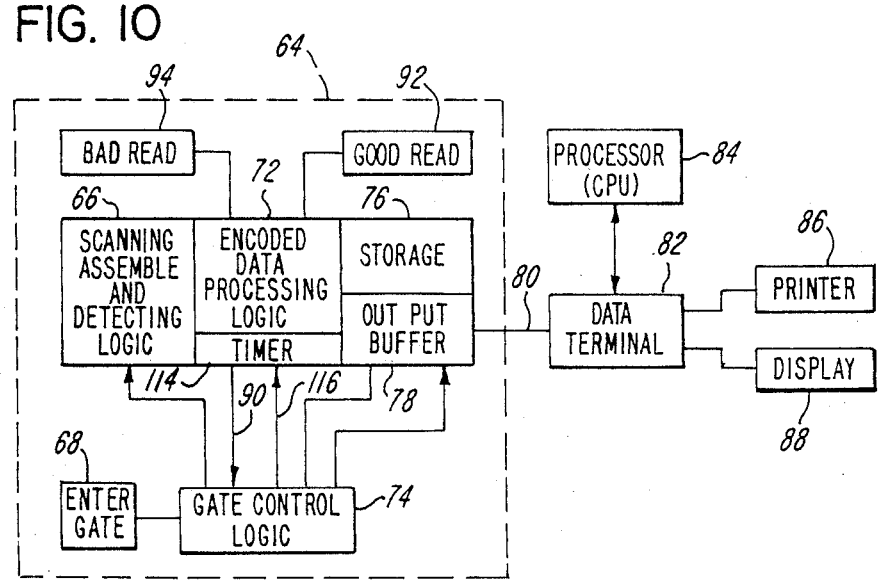
FIG. 10 is a schematic diagram similar to FIG. 7 showing the gate control logic in accordance with the second embodiment of the invention showing the location of the timer circuit.

Referring now to FIG. 9, there is shown a view similar to FIG. 2 of the optical scanning mechanism 42 which includes only the slot 50 housing the silicon photodiode comprising the enter item gate 68 (FIG. 7 and 10). Referring to FIG. 10, there is shown a schematic diagram similar to FIG. 7 of the data processing system utilizing the scanning mechanism shown in FIG. 9 which includes a timer circuit 114 connected to the enter item gate 68 over line 116 and through the gate control logic unit 74. When the enter gate 68 senses the presence of a merchandise item, the electrical signal outputted by the photodiode 95 energizes the timer circuit 114 which, after the expiration of a predetermined time period, will disable the scanning mechanism 42 from projecting light beams through the apertures 48 (FIGS. 2 and 9). In the present embodiment the timeout period is 750 milliseconds.

While only two embodiments of the detector gates have been described in detail herein and shown in the accompanying drawings, it will be obvious that variations and other embodiments are possible without departing from the scope of the invention. It is thus contemplated that all such variations and embodiments that fall within the spirit and scope of the invention hereof shall be construed in accordance with the following claim.

We claim:

1. A system for controlling the operation of an optical scanning mechanism for reading encoded indicia on a record member upon movement of the record member past the scanning mechanism comprising:
   a checkout counter having a horizontal supporting surface including an aperture for supporting a merchandise item having a record member located thereon;
   an optical scanning mechanism mounted within said checkout counter adjacent the aperture for projecting scanning light beams through the aperture when operated;
   a fluorescent lamp member positioned above the supporting surface of the checkout counter for directing radiant energy perpendicular to the supporting surface;
   a first silicon photodiode mounted in the supporting surface of the counter upstream of the aperture and in the path of movement of the merchandise item, said photodiode receiving the radiant energy from said fluorescent lamp member for generating a first control signal in response to the positioning of the merchandise item over said photodiode;
   circuit means coupled to said first silicon photodiode and said scanning mechanism for initating the operation of said scanning mechanism in response to the generation of said first control signal; and
   a second silicon photodiode mounted in the supporting surface of the counter downstream of the aperture and in the path of movement of the merchandise item, said second photodiode coupled to said circuit means and receiving the radiant energy from said fluorescent lamp member for generating a second control signal in response to the positioning of the merchandise item over said second photodiode whereby said circuit means disables the operation of the scanning mechanism in response to the generation of said second control signal.

* * * * *